Dec. 7, 1965          J. R. MEYER          3,221,476
ADSORPTION-DESORPTION METHOD
Filed Dec. 7, 1961
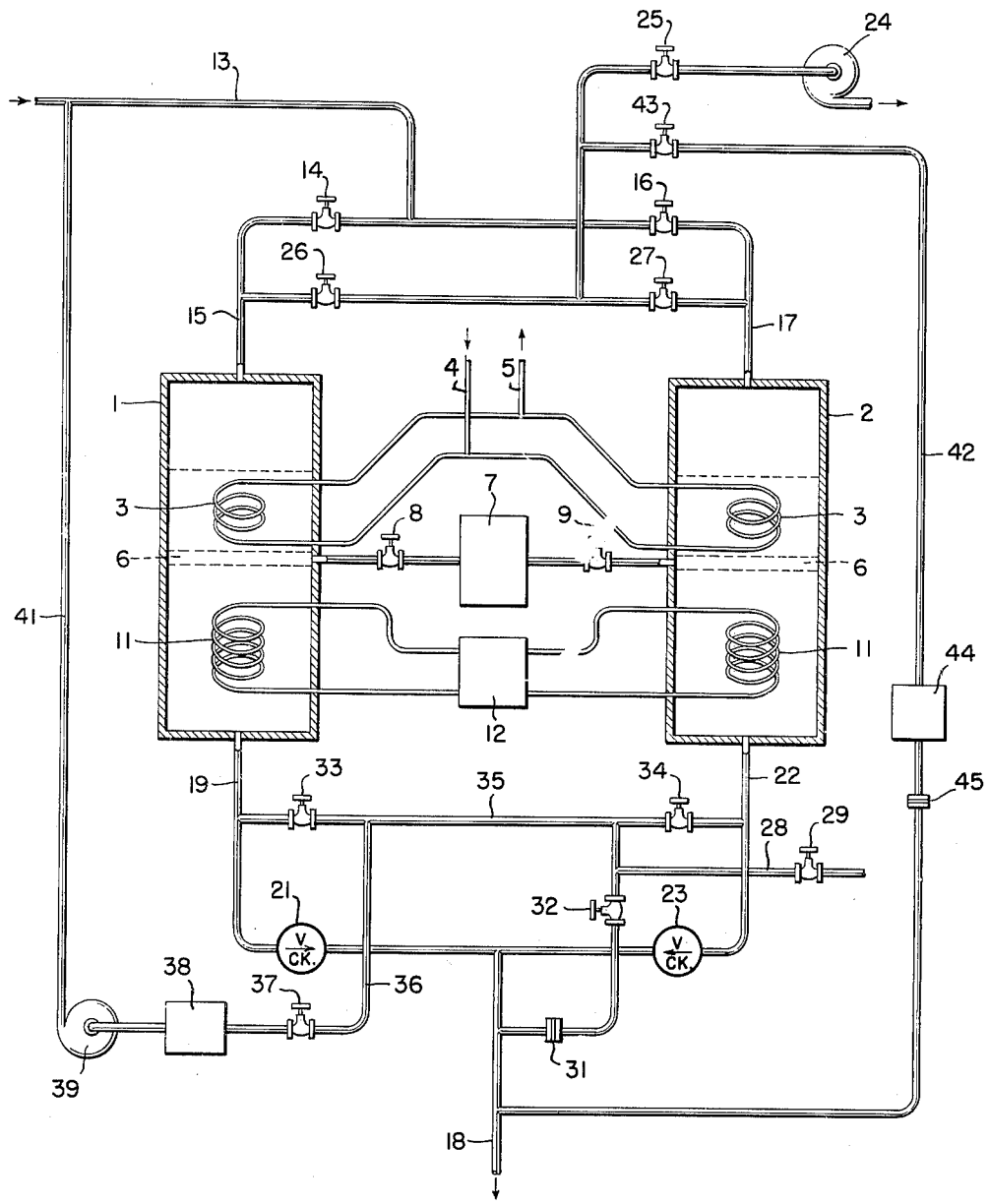
*INVENTOR.*
JAMES R. MEYER
BY *E. W. Swason*
ATTORNEY.

3,221,476
ADSORPTION-DESORPTION METHOD
James R. Meyer, Lewiston, N.Y., assignor to Chemical Design, Inc., a corporation of New York
Filed Dec. 7, 1961, Ser. No. 157,805
5 Claims. (Cl. 55—28)

The present invention relates to adsorbent process, and more particularly to such a process that is designed to remove the contaminants from a hydrogen rich stream of gas to produce substantially pure hydrogen. The invention also relates to such a process for purifying various other gases.

In various industrial processes it is desirable to have a supply of pure hydrogen. This gas can be readily produced in quantity at relatively low purities in the neighborhood of 75%. The problem has been economically and rapidly to increase the purity to about 98% hydrogen or higher by removing various contaminants from the original feed gas.

It is an object of the present invention to provide a method of operating the apparatus in which a stream of gas rich in hydrogen is treated to remove the contaminants and produce a substantially pure hydrogen.

It is a further object of the invention to provide an adsorption method whereby hydrogen or a hydrogen rich product can be obtained from a feed stream consisting of a mixture of gases including hydrogen.

It is a further object of the invention to provide an adsorption process which uses a relatively small amount of adsorbent material for the volume of gas that can be treated and a system that is efficient.

The process includes a pair of identical towers through which the gas to be treated is passed alternately. The adsorbent is selected to adsorb those contaminants it is desired to remove from the gas being treated, and the adsorbent is maintained at temperatures at which the adsorbing operation will take place most efficiently. In practicing the invention the adsorption process takes place at an elevated pressure, while the towers are purged of the adsorbed gas at a reduced pressure.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

The single figure of the drawing shows diagrammatically the process, including the piping and valve arrangements used therewith.

Referring to the drawing, there is shown a pair of identical towers 1 and 2 that are filled with an adsorbent and through which the stream of gas to be treated flows alternately. For purposes of this description, the adsorbent used is of the type usually known as a molecular sieve. The adsorbent is, in effect, divided into zones or layers that are maintained at different temperatures. As shown herein, there are three zones, with the upper comprising about one quarter of the towers and being kept at the temperature to which it is heated by the incoming gas. The second quarter of each tower is provided with a cooling coil 3 through which cooling water is circulated from supply and exhaust mains 4 and 5, respectively, to keep the adsorbent at about 85° F., or what can be considered ambient temperature.

At about midpoint of each tower there is provided a space 6 which may or may not have adsorbent in it. It is noted that, if desired, the towers can be made in separate sections with the space 6 being a connection between them. The spaces 6 are connected by appropriate pipes with a pressure tank 7. Between tower 1 and tank 7 is a valve 8, with a similar valve 9 being between the tank and tower 2.

The adsorbent in the lower half of each tower is maintained at a temperature of about 0° F. by means of a heat exchanger which may be in the form of coils 11 in the tower through which a refrigerant flows from a refrigerating unit 12.

The gas mixture to be treated is introduced alternately to the top of the towers through a feed line 13, past valve 14 in branch 15 or valve 16 in branch 17. Treated gas is discharged from the bottom of the towers to a process gas line 18 through branch line 19 and valve 21 or through branch line 22 and valve 23. It is noted that valves 21 and 23 are preferably check valves that will permit flow of gas only in a direction from the towers to product line 18.

Periodically the towers must be purged or reactivated to remove the contaminating gases from the adsorbent. This purging is done under a reduced pressure, so provisions must be made for depressurizing the towers prior to the purge cycle and repressurizing them prior to being placed on stream. The reduced pressure is provided by a vacuum pump 24 that is connected with the towers through piping including valve 25 and valve 26 or valve 27.

Purge gas is supplied to the towers either from a supply of gas maintained for that purpose through a pipe 28 and valve 29, or from the purified gas through a fixed orifice 31 and valve 32. The purge gas flows to the towers through a pipe 35 having in it a valve 33 for tower 1, or a valve 34 for tower 2.

A blowdown connection from the towers extends from pipe 35 through a pipe 36 and valve 37 to a pressure and storage tank 38. This tank is connected by a pump or compressor 39 and pipe 41 to feed line 13. A repressurizing line for the towers consists of a pipe 42 extending from product line 18 to the top of the towers through the pipe having valves 26 and 27 in it. Pipe 42 is provided with a valve 43. In order to prevent sudden surges in the process line as the towers are repressurized, there is provided a storage tank 44 in pipe 42 with a restricted orifice 45 between the tank and line 18. At times it may be desirable to maintain the pressure in storage tank 44 higher than that in product line 18. If this is the case, an additional compressor can be placed in pipe 42 up stream of orifice 45.

It is noted that all of the valves in the system, except check valves 21 and 23, are automatic control valves of some conventional type. These valves can be either pneumatically or electrically operated, and it is preferred that they be fast acting, on-off valves.

Before describing the operation of the apparatus in detail, it may be stated generally as follows: The mixture of feed gas is supplied preferably at a pressure of about 120 to 135 pounds per square inch absolute and a temperature of about 150° F. to the tower then on stream. By the time the adsorbent in this tower has been substantially filled with the contaminant removed from the gas being recovered, the other tower has been repressurized and is ready to be placed on stream. When a tower is taken off stream, it is depressurized in steps and then placed under vacuum. A stream of purge gas that may be either a portion of the purified gas or a specially prepared purge gas is then back flowed through the tower to remove the contaminants. The tower is then repressurized in steps and is ready to be placed on stream. By reducing and increasing the pressure of the towers in steps, violent surges in the gas being treated are avoided.

For purposes of this description, it will be assumed that pure hydrogen is the desired product gas and that the feed gas contains essentially 75% hydrogen, 21% carbon dioxide, 1½% carbon monoxide, .4% methane, with the remainder, of about 2%, water vapor. This is a typical hydrogen rich gas produced by a steam methane reformer after one stage of water gas shift conversion. The gas is heated and compressed to the above mentioned temperature and pressure, respectively, and supplied to feed pipe 13.

The various automatic valves, which may be solenoid valves, for example, are operated in the sequence set forth below by a conventional timer mechanism, a number of which are commercially available. These mechanisms can be set to close and open a plurality of switches in a predetermined sequence at predetermined times. These switches are connected to operate the various valves. In the operation of the system, assume that tower 1 is on stream. Valve 14 will be open so that the gas will flow through pipe 13, valve 14, pipe 15 to tower 1. Clean or pure hydrogen will flow through pipe 19, check valve 21 and pipe 18 to the point of use.

The adsorbent can be any material that has an affinity for the gas to be removed at the temperatures that can be or are being maintained in the towers. For the example being described, the adsorbent in each tower will be two beds of molecular sieves of calcium or sodium zeolite. The adsorbent can have various pore sizes, and each bed can have pores of the same size. It is preferred, however, that the pore size of the upper bed be 13 angstroms, while that of the lower bed be 5 angstroms. As the gas flows through the tower, it will have removed from it successively and in the upper bed water vapor, $CO_2$, and in the lower bed methane and CO, so that the effluent passing through product line 18 is substantially pure hydrogen. A typical analysis of the effluent gas is 99.9% hydrogen, zero $CO_2$, a dewpoint of $-100°$ F. with respect to water, CO content of about 0.01% and methane of 0.1% or less. Thus, in one simple separation process through a single adsorption tower virtually all impurities have been removed from the hydrogen, leaving a gas that is pure enough for practically any use. The obtaining of this purity with efficient operation is due not only to the temperature levels at which the adsorbent is maintained, but also to the manner in which the flow is switched from one tower to the other and the manner in which the towers are purged, as explained below. It is noted that the different temperature levels of the towers increases the efficiency of the regeneration or desorption cycle of the adsorbent. The materials adsorbed can be readily removed, when the adsorbent is maintained at the temperatures noted above, with a minimum of purging gas.

While tower 1 has been on stream at line pressure, tower 2 has been purged under vacuum. When the purging is completed, tower 2 is repressurized to line pressure in steps prior to being placed on stream. This is accomplished first by opening valve 9 to permit partially cleaned gas stored under pressure in tank 7 to flow into tower 2, thus raising its pressure to an intermediate value. Valve 9 is closed and valves 43 and 27 are opened to equalize the pressure in the tower with the line pressure in pipe 18. These valves are then closed. Applying the pressure to tower 2 in steps prevents a surge in the system that will displace the adsorbent, and repressurizing before placing the tower on stream will prevent a violent increase in the velocity of the feed gas when it first flows into the tower with resultant break-through of impurities. After repressurizing, tower 2 is placed on stream by closing valve 14 and opening valve 16. Gas will then flow through this tower and check valve 23 to product line 18.

The first step in reactivating tower 1 is to reduce its pressure. Valve 8 is opened connecting the tower and tank 7. Gas will flow into the tank to increase its pressure, and reduce the pressure in the tower to an intermediate value, where it will be kept for the partial repressurization of the tower when purging or reactivating is completed. The pressure in tower 1 and tank 7 at this time will depend upon their relative sizes, which are designed so that for the feed pressure indicated this intermediate pressure can be about 60 p.s.i.a. This gas comes from the center of the tower and is purer than the feed stock, and can readily be used for repressurization without detrimental effects. When the pressure in tank 7 and tower 1 is equalized, valve 8 is closed and valves 33 and 37 are opened. Gas is then exhausted to substantially atmospheric pressure into storage tank 38. This gas, which is purer than the feed stock, can be recycled without loss by compressor 39 through pipe 41. Valves 33 and 37 are closed and valves 26 and 25 are opened to connect the tower to the vacuum pump 24, so that the tower can be evacuated. Valve 33 is then opened for the introduction of purge gas to sweep the impurities from the adsorbent. This purge gas can be either the effluent in line 18 or gas from a separate source prepared for this purpose. If the effluent is used, valve 32 is opened and gas will flow at a reduced pressure through fixed orifice 31 and through the tower to be exhausted by pump 24. If the purge gas is from a separate source, valve 29 will be opened instead of valve 32. After the adsorbent in the tower is clean, valves 25, 26 and 33 will be closed, and the tower is ready to be repressurized.

Repressurization of tower 1 takes place as did the repressurization of tower 2. First valve 8 is opened to increase its pressure by the gas in tank 7, which, of course, will be somewhat higher than that of the tower, then valves 43 and 26 are opened to bring the tower substantially to line pressure. It is noted that between the time tower 2 was pressurized and the time valve 43 is again opened, gas has been flowing past orifice 45 to bring the pressure in tank 44 up to line pressure. When valve 43 is opened, tower 1 is supplied mainly from tank 44 with the result that, because of orifice 45, there is no appreciable change in the line pressure. The tower is then ready to take over from tower 2, which, by this time, needs to be reactivated.

The same steps are followed in depressurizing and reactivating tower 2 that were described in connection with tower 1. The corresponding valves are operated in a similar sequence.

By operating the towers at an elevated pressure, a large volume of gas can be treated in relatively small towers using a relatively small amount of adsorbent. If the towers used are four feet in diameter and six feet tall, about 100,000 cubic feet of gas per hour can be handled. It is noted that instead of using a tower of large diameter, a plurality of towers of small diameter having the same total area may be used in parallel. Reactivating the towers under vacuum reduces materially the volume of purge gas that is required. The flow of pure hydrogen that is required for purging, if the effluent is used for this purpose, is not more than 6% of the hydrogen produced. Therefore, with the present system and method, at least 94% of the hydrogen introduced into the towers is recovered. This is a remarkable efficiency. It is noted that substantially no gas is lost during depressurization, since the only loss is that removed by vacuum pump 24 after the tower has substantially reached atmospheric pressure by exhausting into tank 38.

Ordinarily the timer operating the various valves will be such that reversal from one tower to the other usually takes place at intervals about three minutes or less. This frequency of operation is such that the capacity of the adsorbent is never completely used, and the heat of adsorption is offset by the heat loss due to desorption to an extent that supplemental external cooling or heating, other than that required to heat the feed stock and to keep the beds at the proper operating temperature levels, is not required to keep the towers at their normally operating temperature levels.

From the above it will be seen that there is provided a novel apparatus and method of operating it for removing the impurities from a gas, described herein as hydrogen. Reducing and increasing the pressure in the towers in steps insures that the adsorbent in the towers will not be disturbed by violent fluctuations in the flow of gas, while the manner of depressurizing reduces the loss of gas at that time and during purging to negligible proportions. The rapid cycling between the towers in conjunction with the pressure difference between the towers during operation and reactivation permits a large volume of gas to be treated in relatively small towers with remarkable efficiency.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a method of desorbing an adsorbing tower operated under pressure and having separated sections that are each filled with an adsorbent material and through which a feed gas to be treated is flowing from a supply of gas to be treated at a given pressure which improvement comprises cutting off supply of feed gas partially reducing the pressure in the tower by withdrawing gas from between said sections, storing said gas, reducing the pressure in said tower substantially to atmospheric from the exit end thereof by withdrawing gas therefrom, returning said last mentioned gas to the supply of feed gas to be treated, applying a vacuum to the tower, flowing a purge gas through the tower while vacuum is applied thereto, stopping the purge gas and disconnecting the vacuum, returning the stored gas to the tower to raise its pressure partially to said given pressure and connecting the tower to gas that has been treated to raise its pressure to said given pressure.

2. The method of claim 1 in which the purge gas is directed through the tower in a direction opposite that of the flow of gas to be treated.

3. The method of operating an adsorption system having a pair of towers filled with an adsorbent and through which a gas to be treated flows alternately which comprises, flowing a stream of feed gas through a first tower at an elevated pressure, for a predetermined period of time on adsorption then transferring the flow of feed gas to a second tower, on desorption reducing the pressure in the first tower to an intermediate pressure and storing the gas released therefrom, reducing the pressure in the first tower substantially to atmospheric and returning the gas released to the flowing feed gas stream, applying a vacuum to said first tower, supplying a purge gas through the first tower to desorb the adsorbent at said vacuum pressure, return the stored gas to the first tower to increase the pressure substantially to said intermediate pressure, connecting said first tower to the effluent from the second tower to increase pressure of the first tower to feed gas pressure, transferring the flow of feed gas to the first tower, and performing the same operations on the second tower that were performed on the first after the flow of gas was transferred to the second tower and prior to transferring the flow again to the second tower.

4. The method of reactivating the adsorbent in an adsorbent tower, through which a feed gas stream flows under pressure from a feed gas supply line, with no substantial loss of gas which comprises cutting off the supply of feed gas to and the discharge of feed gas effluent gas from the tower, partially depressurizing the tower by removing a portion of the gas therein, storing the removed gas, reducing the pressure in the tower substantially to atmospheric by removing additional gas therefrom and returning said additional gas to the feed gas supply line, applying a vacuum to the tower, flowing a purge gas through the tower in a reverse direction of the flow of feed gas to desorb contaminants from the adsorbent, disconnecting the vacuum and the flowing purge gas, returning the stored gas to the tower to partially repressurize it, and connecting the tower to feed gas effluent to raise the pressure of the tower to the pressure of the feed gas stream.

5. The method of claim 4 in which gas removed for partial depressurization and gas returned for partial repressurization is withdrawn from and returned to a point intermediate the ends of the tower in which the feed gas is introduced and the effluent removed.

References Cited by the Examiner

UNITED STATES PATENTS

| | | | |
|---|---|---|---|
| 1,680,840 | 8/1928 | Barnebey | 55—58 |
| 1,896,816 | 2/1933 | Perley | 55—58 |
| 2,254,799 | 9/1941 | Erdmann | 55—25 |
| 2,359,660 | 10/1944 | Martin et al. | 55—33 |
| 2,882,243 | 4/1959 | Milton | 55—75 |
| 2,882,244 | 4/1959 | Milton | 23—113 X |
| 2,944,627 | 7/1960 | Skarstrom | 55—33 |
| 2,992,703 | 7/1961 | Vasan et al. | 55—62 |
| 3,011,589 | 12/1961 | Meyer | 55—68 |
| 3,037,338 | 6/1962 | Snyder | 55—75 X |
| 3,078,635 | 2/1963 | Milton | 55—75 |
| 3,078,639 | 2/1963 | Milton | 55—75 |
| 3,085,379 | 4/1963 | Kiyonaga et al. | 55—75 |
| 3,101,261 | 8/1963 | Skarstrom | 55—75 |
| 3,102,003 | 8/1963 | Krummer | 55—68 |
| 3,103,425 | 9/1963 | Meyer | 55—68 |
| 3,104,162 | 9/1963 | Skarstrom | 55—68 |
| 3,111,387 | 11/1963 | Avery et al. | 55—75 |
| 3,141,748 | 7/1964 | Hoke et al. | 55—25 |
| 3,150,942 | 9/1964 | Vasan | 55—31 |

FOREIGN PATENTS 860,311   2/1961   Great Britain.

REUBEN FRIEDMAN, *Primary Examiner.*